UNITED STATES PATENT OFFICE.

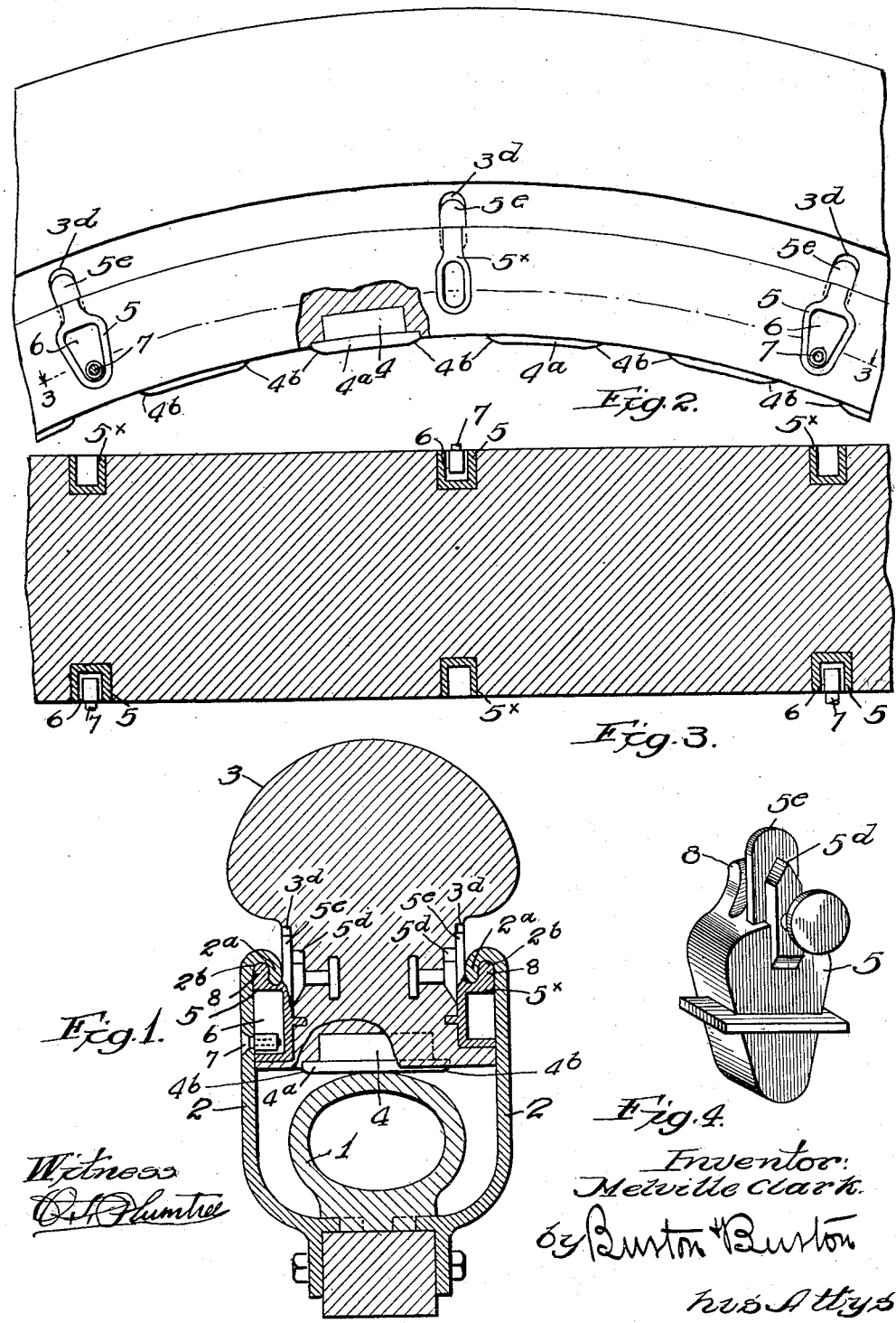

MELVILLE CLARK, OF CHICAGO, ILLINOIS.

VEHICLE-WHEEL TIRE.

1,215,486.  Specification of Letters Patent.  Patented Feb. 13, 1917.

Application filed May 8, 1916. Serial No. 96,010.

*To all whom it may concern:*

Be it known that I, MELVILLE CLARK, a citizen of the United States, residing at Chicago, in the county of Cook and State of Illinois, have invented new and useful Improvements in Vehicle-Wheel Tires, of which the following is a specification, reference being had to the accompanying drawings, forming a part thereof.

The purpose of this invention is to provide an improved construction of a pneumatic cushioned tire. It consists in the elements and features of construction shown and described, as indicated in the claims.

In the drawings:—

Figure 1 is a transverse section of the tire and felly in a plane radial with respect to the wheel.

Fig. 2 is a side elevation of the tread member of the tire.

Fig. 3 is a section at the line, 3—3, on Fig. 2.

Fig. 4 is a perspective of one of the metal members embedded in the tread member for engaging the lateral guard.

The tire illustrated in the drawings and containing this invention, is of the class commonly known as combined pneumatic and cushion tire, comprising an inner pneumatic tube, 1, lateral metal guards or flanges, 2—2, which form a seat for pneumatic tube and a channel for inclosing the tread member, 3. The features which constitute this invention are contained in and associated with the tread member, 3, and will now be described.

In the inner circumference of the tread member are formed pockets in which are lodged wooden blocks, 4, whose inner surfaces seat upon the outer circumference of the pneumatic tube, 1, for the specific purpose of preventing rubbing contact between the rubber surface of the pneumatic tube and the rubber surface of the tread member, such rubbing contact being well known to be deleterious to the rubber members. For this purpose the block protrudes slightly from the inner circumference of the tread member so that the inner tube, 1, is held out of contact with the tread member. Broadly considered, these blocks are not new having been shown in my previous Patent No. 1,108,703, dated August 25, 1914, but the improvement presented in the present blocks consists in providing them with a flange, $4^a$, extending preferably around all four sides,—that is to say, from all four corners of the inner surface of the block, though it is more particularly essential only to have them extending from the two transverse edges. The purpose of these flanges is to resist the liability of the blocks to be turned over in their seats in the tread member by the circumferential drag of the tread member and inner tube relatively to each other which sometimes tends to cause one of the transverse corners of the block to become exceptionally engaged with the outer surface of the inner tube while the diagonally opposite corner is somewhat dragged by the tread member, with the possibility of tipping the block in its seat and an ultimate possibility of tipping it over or swinging it out of its seat. This is prevented by the flanges, $4^a$, which are themselves seated in the pockets in the inner circumference of the tread member, said pockets being rabbeted to afford such seat for the flanges allowing only a very slight protrusion of the block from the inner face of the tread as stated. And to further tend to defeat the turning over of the blocks the protruding corners of the flanges are rounded as shown at $4^b$, so as not to be liable to bite into or become engaged with the outer circumference of the inner tube, 1.

In the tire shown in my said Patent No. 1,108,703, metal members are embedded in the opposite lateral surfaces of the tread member for the purpose of affording engagement of the tread member with the lateral guards, 2—2, to prevent creeping of the tire, while permitting the tire to have a direct radial movement with respect to the wheel under the changes of load. Such engagement is effected by means of studs projecting rigidly inward from the lateral guards, into radially-elongated pockets in the embedded metal members. In my said former patent the studs (having anti-friction rollers upon them) being loosely fitted into the radial pockets or slots in the embedded metal member, are designed to travel inward and outward along the slots, with the rollers on said studs bearing and rolling upon the side of the slots which is pressed against said rollers by the drag resulting from the traction of the wheel on the road, and the slots themselves are of uniform width throughout their entire radial extent, having their middle line in radial plane, and their lateral surfaces parallel to such radial plane, and therefore substantially radial with respect to the wheel. In practice I have found that the friction of the studs, even with the rollers upon them, against the sides of these slots under the severe drag of the tread member, while the radial movement is being caused by the pressure of the load, causes the embedded metal members to be rapidly cut away, that is, the sides of the slots wear away, and there is soon formed a shoulder in the side exposed to the wear which stops the stud or rollers, preventing the radial movement of the tread beyond the limit at which such stoppage occurs, and so compelling the shoulder to carry the entire load, with the result that the wall of the slot is eventually broken away and the stud works out beyond the metal member into the rubber substance of the tread member with destructive effect. Upon consideration it will be seen that only one, or at most, two of the embedded metal members at the side of the tread is at any time exposed to the action above described, that is, there is only one, or at most, two at any time comprised within the segment of the tire which is flattened by the load at the bottom side of the wheel; and that all the remainder of the engagements afforded by the studs entering the metal members are operative for preventing the creeping of the tire, and that it is not necessary therefore to rely upon the engagement of the stud with the wall of the slot of the particular embedded member in which the radial movement of the stud in the slot is occurring, for preventing creeping. In the structure herein shown, therefore, are formed these embedded metal members, 5, with slots, 6, for engagement of the studs, 7, projecting rigidly inward from the lateral guards, 2, are formed differently from my said Patent No. 1,108,703, in that the said slots or pockets, 6, are at their inner ends wide enough simply to accommodate the rolls on the studs, 7, without binding, and from said inner ends they taper widening outward, the lateral surfaces therefore diverging from radial planes, said divergence being calculated to be sufficient to accommodate all the stretch of the tread member through the segment extending from the point which is engaged for traction on the road-bed back to the next embedded metal member which is engaged at the inner end of its slot with the studs of the lateral guards; so that in the radial movement which results from the compression of the tread throughout the segment which is carrying the load, the side of the slot moves out of contact with the stud, avoiding all the friction which has had destructive effect in the previously constructed tires. The essential principle of this feature of the invention it will be seen is that the resistance to creeping is afforded by the engagement of the studs in the embedded metal members at that greater part of the circumference of the wheel where there is no relative radial movement of said studs and metal members, and that the one or two metal members which are subject to that radial movement are at that time relieved from the duty of resisting creeping, by the divergence of the walls of the slot from the radial path of movement which would cause friction of the studs upon the wall of the slots.

A primary purpose of the embedded metal members, 5, in the present construction, as in that of my Patent No. 1,108,703, is to carry lugs, 8, which are engaged with inturned flanges, $2^a$, forming inwardly-facing circumferential grooves, $2^b$, at the outer circumference of the lateral guards, 2, said metal members thereby serving the purpose, by their embedment in the tread member, of tying together the opposite circumferential edges of the guards, the tread member constituting a part of the tie, and by its flexibility preventing such tying together of the guard from being so rigid as to cause the wrenches to which the wheel is subjected by lateral stresses from unduly straining the parts. In my former Patent No. 1,108,703, these embedded metal members in equal numbers at opposite sides of the tread member and arranged respectively directly in pairs and directly opposite each other, are all provided with slots for engagement of the studs projecting inwardly from the lateral guards respectively; so that at each point at which the two members of a pair constituted, together with the intervening portion of the tread member, a tie from one lateral guard to the other, there was also an engagement of said metal members with the lateral guards respectively for preventing creeping. I have found not only that it is needless to provide for such engagement against creeping at directly opposite points, or at so many points as it is desirable to provide for the tie engagements above mentioned, but also that it is advantageous not to have the engagement against creeping situated at directly opposite points, but rather to have these engagements staggered from side to side,—that is, the engagement at one side being opposite the interval between engagements at the opposite side. The advantage of such staggered arrangement of the engagements against creeping is, that in the lateral stresses to which the tread member is subjected, the opportunity for the very slight bending which the staggered arrangement of these engagement points affords, operates to relieve or distribute the lateral strain from the tire and somewhat diminish the jar upon the vehicle which is absorbed by the elasticity of the tread member when it can yield thus slightly by bending between the points of engagement. In the present construction therefore I provide only alternate ones of the embedded metal members, 5, with the slots, 6, for engagement of the studs, and I provide studs only at alternate positions, and the embedded members which are thus provided at the opposite sides of the tread alternate with each other circumferentially of the tread, so that those at each side having the provision for engagement of the studs are opposite the intervals between those at the opposite side having such provision. The alternate embedded members which are not thus provided are indicated by reference character, 5×.

Upon considering the action of the tread member with respect to the embedded metal members when the tread is compressed under the load, it will be observed that to the extent that the total compression of the tread member from its seat at its inner circumference on the pneumatic tube to its outer circumference bearing upon the road, exceeds the compression from said outer circumference to the outer shoulder, 5ᵈ, of the embedded metal member, 5, there will be stress imposed upon the rubber of the tread member at the point where it rests upon said shoulder, tending to produce a rupture of the rubber at the corner of the shoulder. In the construction shown in my former Patent No. 1,108,703, this shoulder was extended square across,—that is to say, it faced outwardly substantially in the plane of a chord of the outer circumference of the tread; and this resulted frequently in cracks which would start at the corners of said shoulder and extend outwardly in the substance of the tread member. While these cracks were usually of short extent and did not seriously damage the tread, they were liable to become filled with sand which would eventually cause them to extend by cutting them as the tread was exposed to alternate compression and release of compression. In the present construction this liability to rupture of the tire at the points indicated is prevented by making the outer end of this portion of the embedded metal member bluntly wedge-shaped with the point outward, so that the stress which formerly tended to produce rupture as indicated, is distributed and converted into a tendency to stretch the rubber over the broad sloping sides of the wedge-shaped point thereof; and in practice I find that no rupture is caused even at the blunt point of the wedge.

Although no rupture is caused in the rubber by the construction last above described, the continuous stretching of the rubber as described around the wedge-shaped terminal of the embedded metal member does operate gradually to hammer the rubber away from the latter, causing a slight space to intervene above the bluntly wedge-shaped shoulder or terminal; and in order to prevent the entrance of sand into this space which would tend to cause the rubber to be cut away in the subsequent compressions and reactions, I provide the metal member with a flange, 5ᵉ, at the outer end of the wedge-shaped portion mentioned, and I provide the lateral surface of the tread member with a pocket or recess, 3ᵈ, which accommodates this flange and which is as much longer than the flange as the estimated compression of the tread under load so that when thus compressed the flange will still be accommodated in the recess or pocket and will at all times cover any opening which may be developed between the wedge-shaped shoulder and rubber of the tread member about it.

I claim:—

1. In a vehicle wheel, a tire comprising lateral guards at opposite sides of the wheel; a flexible elastic tread member embraced between the guards; a series of metallic fittings embedded in the tread member at each side, each of said fittings having a pocket elongated radially of the wheel to accommodate a guide stud, said fittings at one side of the tread member being positioned substantially opposite the middle point between two consecutive similar fittings at the opposite side of the tread, the lateral guards having studs projecting inwardly for engaging the pockets in the metallic fittings respectively:

2. In a vehicle wheel tire comprising lateral guards at opposite sides of the wheel and extending circumferentially therefrom; and a flexible elastic tread member embraced between the guards, said guards having each a circumferential groove opening toward the wheel axis; separate inelastic lug members permanently engaged with the opposite sides of the tread member against detachment therefrom by lateral stress, having lugs projecting into engagement with the grooves of the guards respectively; and having flanges extending in a plane parallel to the guards positioned in lugs respectively, the tread member having in its lateral surfaces recesses or pockets in which said flanges are accommodated, so as to be flush with the outer surfaces of the tread member, said pockets being elongated radially of the wheels beyond the outer ends of the flanges to accommodate the latter in the compression of the tread member under load.

3. In a vehicle wheel, a tire comprising separate lateral guards at opposite sides of the wheel, a flexible and elastic tread member embraced between the guards, said guards having each a circumferential groove opening toward the wheel axis; separate inelastic lug members permanently engaged with the opposite sides of the tread member against detachment therefrom by lateral stress, having lugs projecting into engagement with the grooves of the guards respectively, the body of the lug member inwardly opposite the lug being embedded in the tread member and being wedge shaped at its outer end to avoid presenting an abrupt shoulder against the compression of the tread member.

4. A wheel tire comprising lateral guards and an intervening flexible and elastic tread member, and an inclosed pneumatic tube or air spring, the tread member having distributed throughout its inner circumference a plurality of wooden blocks embedded in said tread member, and exposed beyond the inner circumference thereof for contact with the outer circumference of the pneumatic tube, said blocks being flanged about their inner ends for resistance to distortion in their seats.

5. A wheel tire comprising lateral guards and an intervening flexible and elastic tread member, and an inclosed pneumatic tube or air spring, the tread member having distributed throughout its inner circumference a plurality of wooden blocks embedded in said tread member, and exposed beyond the inner circumference thereof for contact with the outer circumference of the pneumatic tube, said blocks being flanged about their inner ends for resistance to distortion in their seats, the pockets in the tread member being rabbeted to receive the flanges, nearly to the full thickness of the latter, the protruding edges of the flanges being rounded to prevent engagement with the pneumatic tube.

In testimony whereof I have hereunto set my hand at Chicago, Illinois, this 4th day of May, 1916.

MELVILLE CLARK.

Copies of this patent may be obtained for five cents each, by addressing the "Commissioner of Patents, Washington, D. C."